（12） United States Patent
Briancon Marjollet et al.

(10) Patent No.: US 10,344,780 B2
(45) Date of Patent: Jul. 9, 2019

(54) PRESSURE REGULATION SERVO-VALVE WITH REDUCED LEAKAGE FLOW RATE

(71) Applicant: SAFRAN LANDING SYSTEMS, Velizy-Villacoublay (FR)

(72) Inventors: Alain Briancon Marjollet, Velizy-Villacoublay (FR); David Delloue, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 15/902,920

(22) Filed: Feb. 22, 2018

(65) Prior Publication Data

US 2018/0245607 A1  Aug. 30, 2018

(30) Foreign Application Priority Data

Feb. 24, 2017  (FR) ...................................... 17 51487

(51) Int. Cl.
*F15B 13/043* (2006.01)
*F15B 13/02* (2006.01)
(Continued)

(52) U.S. Cl.
CPC ............ *F15B 13/021* (2013.01); *B64C 25/42* (2013.01); *F15B 5/00* (2013.01); *F15B 5/003* (2013.01);
(Continued)

(58) Field of Classification Search
CPC .......... F15B 13/021; F15B 5/00; F15B 5/003; F15B 13/0402; F15B 13/0438; F15B 13/044; F16K 31/124; B64C 25/42; G05D 16/2097; G05D 16/2024; G05D 16/2093; Y10T 137/86598; Y10T 137/86606; Y10T 137/86614; Y10T 137/8659
(Continued)

(56) References Cited

U.S. PATENT DOCUMENTS 2,836,154 A * 5/1958 Lantz .................. F15B 13/0438
137/625.25
2,931,389 A * 4/1960 Moog, Jr. ........... F15B 13/0438
137/625.62
(Continued)

FOREIGN PATENT DOCUMENTS

EP    2309135 A1    4/2011
FR    2873828 A1    2/2006

OTHER PUBLICATIONS

Rapport de Recherche Preliminaire / Opinion Ecrite, dated Oct. 31, 2017, issued in corresponding French Application No. 1751487, filed Feb. 24, 2017, 6 pages.

*Primary Examiner* — Kevin F Murphy
*Assistant Examiner* — Kelsey E Cary
(74) *Attorney, Agent, or Firm* — Christensen O'Connor Johnson Kindness PLLC

(57) ABSTRACT

A pressure regulation servo-valve comprising a body having a utilization port, a feed port, and a return port, a spool mounted as a sliding fit in the body, the spool co-operating with the body to define a pilot chamber connected to the utilization port. The spool and the body together further define a priming chamber connected to the feed port via a second constriction and connected to the nozzle via a third constriction, and in which there exists a priming pressure acting on the spool in the first direction.

4 Claims, 1 Drawing Sheet

(51) Int. Cl.
*F15B 13/04* (2006.01)
*F15B 13/044* (2006.01)
*G05D 16/20* (2006.01)
*F15B 5/00* (2006.01)
*B64C 25/42* (2006.01)

(52) U.S. Cl.
CPC ...... *F15B 13/0402* (2013.01); *F15B 13/0438* (2013.01); *F15B 13/0444* (2013.01); *G05D 16/2024* (2019.01); *G05D 16/2093* (2013.01); *G05D 16/2097* (2019.01); *Y10T 137/8659* (2015.04)

(58) Field of Classification Search
USPC ............... 137/625.6–625.65, 625.69, 625.34
See application file for complete search history.

(56) References Cited

U.S. PATENT DOCUMENTS

| | | | | |
|---|---|---|---|---|
| 3,233,623 A | * | 2/1966 | Gray | F15B 13/0438 137/625.62 |
| 3,486,801 A | | 12/1969 | Frayer | |
| 4,152,971 A | * | 5/1979 | Leonard | F15B 9/08 137/625.6 |
| 4,513,782 A | * | 4/1985 | Contartese | F15B 9/09 137/625.62 |
| 2006/0021663 A1 | | 2/2006 | Grancher | |

\* cited by examiner

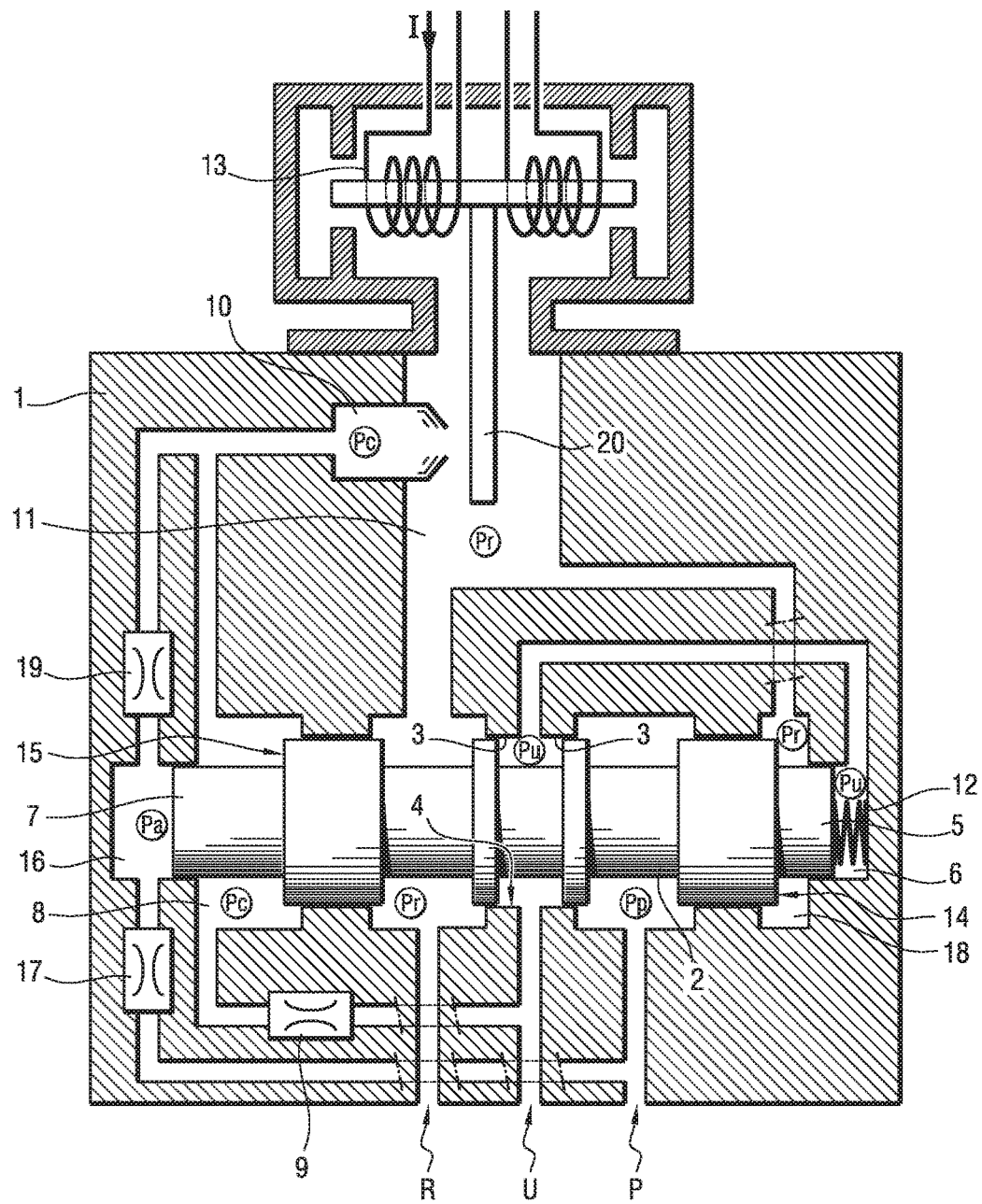

PRESSURE REGULATION SERVO-VALVE WITH REDUCED LEAKAGE FLOW RATE

FIELD OF THE DISCLOSURE

Embodiments of the present disclosure relate to a pressure regulation servo-valve with reduced leakage flow rate.

BACKGROUND

This type of servo-valve is used by way of example for controlling hydraulic brakes for a vehicle, in particular aircraft brakes.

Pressure regulation servo-valves are known that comprise a body presenting a utilization port, a feed port, and a return port, together with a spool movably mounted in the body so as to put the utilization port into communication either with the feed port or with the return port. The ends of the spool co-operate with the body to define at least one pilot chamber connected to a nozzle that is arranged to open out into a cavity that is connected to the return port. A flapper extending in the cavity and facing the nozzle is mounted to move in controlled manner. The pilot chamber is connected via a constriction to the feed port. Where applicable, the servo-valve may have two pilot chambers exerting opposing forces on the spool, with each of the pilot chambers being connected to a respective nozzle mounted facing each other and having the flapper extending between them.

The controlled movement of the flapper facing the nozzle (s) serves to modulate the pressures that exist in the pilot chambers, and thus to move the spool in order to modulate the utilization pressure.

A drawback of that type of servo-valve is that it presents a leakage flow rate that is considerable. Specifically, hydraulic fluid flows permanently through the nozzle and is redirected towards the return port. This leakage requires the hydraulic fluid tanks to be dimensioned accordingly so as to be capable of ensuring braking of the vehicle even in the event of a failure of hydraulic pressure generation.

A solution to this problem is proposed in Document FR 2 873 828, which consists in connecting the pilot chamber(s) to the utilization port. The utilization port is usually at pressures that are lower than the feed port. Connecting the pilot chamber(s) to the utilization port makes it possible to reduce the pressure that exists on average in the pilot chamber(s), thereby leading to a corresponding reduction in the leakage flow rate via the nozzle(s).

Nevertheless, there exist operating circumstances in which such a position can lead to difficulties in the response of the servo-valve. Specifically, when the brakes are not being used, the utilization pressure is substantially equal to the return pressure, and the pilot force, which is then produced essentially by the spring acting on the spool, can be insufficient to move the spool when the brakes are applied once more, e.g. at low temperature or if the movement of the spool is impeded by an impurity in the hydraulic fluid. Starting is then observed to be difficult, and can sometimes be followed with oscillations in the utilization pressure. The use of a pressure feedback loop for controlling the spool does not help the servo-valve when it is in such a situation.

SUMMARY

The embodiments of the present disclosure seek to propose a pressure regulation servo-valve having a low leakage flow rate, while nevertheless presenting a response dynamic range that is sufficient.

In order to achieve this object, there is provided a pressure regulation servo-valve comprising a body having a utilization port, a feed port, and a return port, a spool mounted as a sliding fit in the body so as to put the utilization port in communication with the feed port and with the return port depending on respective flow sections determined by the position of the spool, the spool co-operating with the body to define a pilot chamber connected to the utilization port via a first constriction and connected to a nozzle leading into a cavity connected to the return port, a flapper being mounted to move in controlled manner in the cavity facing the nozzle in order to regulate the leakage flow rate through the nozzle, and thus regulate the pilot pressure in the pilot chamber acting on the spool in order to move it in a first direction. According to the embodiments of the disclosure, the spool and the body together further define an auxiliary pilot priming chamber connected to the feed port via a second constriction and connected to the nozzle via a third constriction, and in which there exists a priming pressure acting on the spool in the first direction.

This provision makes it possible to have sufficient priming pressure in the auxiliary pilot chamber to ensure that the spool starts effectively even when utilization pressure is low or in the event of an opposing force blocking or braking the spool, and it does so at the cost of a small increase in the leakage flow rate.

DESCRIPTION OF THE DRAWING

The foregoing aspect and many of the attendant advantages of the claimed subject matter will become more readily appreciated as the same become better understood by reference to the following detailed description, when taken in conjunction with the accompanying drawing, wherein the FIGURE is a diagrammatic section view of a servo-valve of the disclosure.

DETAILED DESCRIPTION

The detailed description set forth below in connection with the appended drawing, wherein like numerals reference like elements, is intended as a description of an embodiment of the disclosed subject matter and is not intended to represent the only embodiment. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

With reference to the FIGURE, the pressure regulator servo-valve of the embodiments of the disclosure comprises a body or cylinder 1 having a feed port P for connection to a source of hydraulic fluid under pressure, a return port R for connection to a circuit for returning fluid to a tank (not shown), and a utilization port U for connection to a piece of equipment, e.g. the hydraulic cavity of an aircraft brake (not shown).

A spool 2 is slidably mounted in a calibrated orifice in the body 1. The spool 2 has lands 3 that co-operate with little clearance with a central portion 4 of the calibrated orifice and that extends firstly between the utilization port U and the return port R, and secondly between the utilization port U and the feed port P.

Because of the sliding clearance that exists between the lands 3 and the central portion 4 of the calibrated orifice, passages remain that provide communication between the utilization port U and both the return port R and the feed port P. In the position shown, the passages remaining between each of the lands 3 and the central portion 4 of the calibrated orifice are equal, such that the utilization pressure Pu is equal to the mean of the return pressure Pr and of the feed pressure Pp.

When the spool moves, one of the passages increases while the other decreases, such that the utilization pressure takes a mean value that is weighted by the flow sections for the return pressure and for the feed pressure. Movement of the spool thus serves to adjust the utilization pressure Pu to a value that lies between the return pressure Pr and the feed pressure Pp.

The spool 2 co-operates with the body 1 to define a pilot chamber 8, specifically an annular chamber, that is connected to the utilization port U via a first constriction 9 and in which there exists a control pressure Pc that bears against the annular section 15.

The pilot chamber 8 is also connected to a nozzle 10 that leads into a cavity 11 in the body 1 that is connected to the return port R and in which there exists the return pressure Pr. In the cavity 11 and facing the nozzle 10 there is a movable flapper 20 that is actuated by an electric torque motor 13 (powered by an electric current I) to move away from or towards the nozzle 10. Movement of the flapper 20 facing the nozzle 10 serves to modulate at will the control pressure Pc that exists in the nozzle 10 (and thus in the pilot chamber 8) between the return pressure and the utilization pressure.

Furthermore, and in an essential aspect of the embodiments of the disclosure, the spool has a first end 7 that co-operates with the body 1 to define an auxiliary pilot chamber 16 that is connected to the feed port P via a third constriction 17 and in which there exists a priming pressure Pa that applies to the end 7.

The auxiliary pilot chamber 16 is also connected to the nozzle 10 via a third constriction 19 so that the priming pressure Pa varies with movement of the flapper 20, although to a lesser extent than the control pressure Pc.

The action of the control pressure Pc in the pilot chamber 8 and of the priming pressure Pa in the auxiliary pilot chamber 16 tends to move the spool in a first movement direction (to the right in the FIGURE) so as to increase the utilization pressure.

The spool 2 has a second end 5 that co-operates with the body 1 to define a feedback chamber 6 that is connected to the utilization port U and in which there exists the utilization pressure Pu that is applied against the second end 5.

The spool 2 co-operates with the body 1 to define an annular compensation chamber 18 that is connected to the return port R and in which there exists the return pressure Pr that is applied against the annular section 14.

The action of the utilization pressure Pu in the feedback chamber 6 and of the return pressure Pr in the compensation chamber 18 tends to move the spool in a second direction (to the left of the FIGURE) opposite to the first direction, so as to reduce the utilization pressure.

Finally, a spring 12 is arranged in the servo-valve to act on the second end 5 and push the spool 2 in the second direction.

Connecting the nozzle 10 to the utilization port U instead of to the feed port P limits the leakage flow rate through the nozzle insofar as the utilization pressure Pu is almost always less than the feed pressure Pp. In particular, when the actuator connected to the utilization port U is not in operation (which is the usual situation for an aircraft brake), this pressure is slightly greater than the return pressure Pr, such that there is little or no flow to the nozzle. Leakage is then almost zero.

In this situation, starting movement of the spool 2 is made easier by the action of the priming pressure Pa in the auxiliary plot chamber 16, which is large enough to move the spool from its position while the pressure Pc, which is necessarily less than the utilization pressure Pu, remains very low.

The embodiments of the disclosure are not limited to the above description, but on the contrary covers any variant coming within the ambit defined by the claims.

In particular, although the servo-valve shown has only one pilot chamber, the servo-valve of the disclosure could have two pilot chambers, each connected to a respective nozzle, providing at least one of the pilot chambers is connected to the utilization port. In addition, although the pilot chamber 8 is annular while the priming chamber 16 is solid, these two chambers could naturally be interchanged. Likewise, although the feedback chamber 6 is solid while the compensation chamber 18 is annular, these two chambers could be interchanged.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A pressure regulation servo-valve comprising a body having a utilization port, a feed port, and a return port, a spool mounted as a sliding fit in the body so as to put the utilization port in communication with the feed port and with the return port depending on respective flow sections determined by the position of the spool, the spool co-operating with the body to define a pilot chamber connected to the utilization port via a first constriction and connected to a nozzle leading into a cavity connected to the return port, a flapper being mounted to move in controlled manner in the cavity facing the nozzle in order to regulate a leakage flow rate through the nozzle, and thus regulate a pilot pressure in the pilot chamber acting on the spool in order to move the spool in a first direction, wherein the spool and the body together further define a priming chamber connected to the feed port via a second constriction and connected to the nozzle via a third constriction, and in which there exists a priming pressure acting on the spool in the first direction.

2. The servo-valve according to claim 1, wherein the spool co-operates with the body to define a feedback chamber connected to the utilization port and acting on the spool in order to move the spool in a second direction opposite to the first direction.

3. The servo-valve according to claim 1, wherein the spool co-operates with the body to define a compensation chamber connected to the return port and acting on the spool to move the spool in a second direction opposite to the first direction.

4. The servo-valve according to claim 1, including a spring acting on the spool in order to move the spool in a second direction opposite to the first direction.

\* \* \* \* \*